US012720109B2

(12) United States Patent
Chen et al.

(10) Patent No.: US 12,720,109 B2
(45) Date of Patent: Aug. 25, 2026

(54) FAST RECOVERY OF VIDEO QUALITY USING COMPANION STREAMS

(71) Applicant: Adeia Guides Inc., San Jose, CA (US)

(72) Inventors: Tao Chen, Palo Alto, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 52 days.

(21) Appl. No.: 18/821,315

(22) Filed: Aug. 30, 2024

(65) Prior Publication Data

US 2026/0067495 A1 Mar. 5, 2026

(51) Int. Cl.
*H04N 19/59* (2014.01)
*H04N 19/159* (2014.01)

(52) U.S. Cl.
CPC ........... *H04N 19/59* (2014.11); *H04N 19/159* (2014.11)

(58) Field of Classification Search
None
See application file for complete search history.

(56) References Cited

U.S. PATENT DOCUMENTS

2023/0269395 A1* 8/2023 Yang .............. H04N 21/234327 375/240.21

OTHER PUBLICATIONS

Van Wallendael, G.; Mareen, H.; Vounckx, J.; Lambert, P. Keyframe Insertion: Enabling Low-Latency Random Access and Packet Loss Repair. Electronics 2021, 10, 748. https://doi.org/10.3390/electronics 10060748 (Year: 2021).*

Battista, S., et al., "Overview of the Low Complexity Enhancement Video Coding (LCEVC) Standard", IEEE Transactions on Circuits and Systems for Video Technology, vol. 32, No. 11, Nov. 2022, 13 pages.

Boyce, J. M., et al., "Overview of SHVC: Scalable Extensions of the High Efficiency Video Coding Standard", IEEE Transactions on Circuits and Systems for Video Technology, vol. 26, No. 1, Jan. 2016, 15 pages.

Pieter-Jan Speelmans, "Operating HESP with low encoding costs", available onlne at: <https://www.theoplayer.com/blog/operating-hesp-with-low-encoding-cost>, Oct. 6, 2021, 2 pages.

Schwarz, H., et al., "Overview of the Scalable Video Coding Extension of the H.264/AVC Standard", IEEE Transactions on Circuits and Systems for Video Technology, vol. 17, No. 9, Sep. 2007, 18 pages.

(Continued)

*Primary Examiner* — Kaitlin A Retallick
(74) *Attorney, Agent, or Firm* — HG Law LLP

(57) ABSTRACT

A source video received for encoding in a streaming protocol in which video is encoded in normal streams and companion streams. A first upscaled frame is generated by upscaling a first frame from a first resolution to a second resolution. Based on the first upscaled frame and a corresponding frame of the second resolution, a residue representing a difference between the first upscaled frame and the corresponding frame is generated and encoded in a companion stream associated with the second resolution. Upon accessing the encoded video at a time when no I-frame is encoded in any normal stream, an output stream displays a high-resolution image based on an I-frame in the first companion stream associated with the first resolution and the residue in the companion stream associated with the second resolution.

18 Claims, 12 Drawing Sheets

(56) References Cited

OTHER PUBLICATIONS

U.S. Appl. No. 18/795,341, filed Aug. 6, 2024, Title: Systems and Methods for Fast Resolution Recovery in Mixed-Resouliton HESP Streams.

Wallendael, et al., “Mixed-Resolution HESP for More Efficient Fast Channel Switching and Packet-Loss Repair”, 2022 Picture Coding Symposium (PCS), 5 pages (2022).

* cited by examiner

FAST RECOVERY OF VIDEO QUALITY USING COMPANION STREAMS

BACKGROUND

This disclosure relates to video compression in streaming media. In particular, solutions for encoding keyframes in companion streams (e.g., of High Efficiency Streaming Protocol (HESP) streams) are provided.

SUMMARY

Low-latency video streaming and fast channel changes remain challenging in the field of streaming media. Video streaming with HESP provides several benefits over other streaming protocols. When facing network bandwidth improvement or degradation, HESP can rapidly switch to a higher or lower bitrate, reducing the need of large buffers to account for startup time of a new stream. For viewers who want to select a different channel or viewing angle, HESP can instantly switch to the other feed with a minimum latency.

Video streaming service providers invest significant efforts to increase the viewer-friendliness of live streaming. For example, video content is typically encoded at multiple resolutions and quality levels in an adaptive bitrate (ABR) ladder. However, it has always been a challenge to provide low-latency channel switching (i.e., random access) and packet-loss repair. This is largely due to the fact that key frames that can be decoded without reference to previous frames (i.e., I-frames) typically occur infrequently (e.g., every couple of seconds). In practice, this frequency is set by the GOP (group of pictures) size of the stream. It is highly desirable to have a large GOP size for better compression efficiency. On the other hand, smaller GOP sizes allow for faster random access and recovery from packet-loss.

HESP utilizes key frame injection or key frame insertion, combining the advantages of both a long GOP and a short GOP. A compression-efficient normal stream that uses a long GOP size is accompanied by a companion stream that only consists of keyframes (i.e., a very short GOP size). During streaming, clients receive the normal stream by default. In the case that a channel change occurs, or a packet loss is encountered, the next occurring keyframe from the companion stream is transmitted. This keyframe substitutes the corresponding frame in the normal stream. More broadly, a normal stream is any video stream that is intended for continuous receipt and decoding by a client device while a companion stream only contains versions of select frames from the normal stream. HESP was initially proposed for low-latency HTTP adaptive streaming, and it has already been tested in low-latency multicast streaming. The solution is also applicable to IPTV and content delivery to set-top boxes.

In some cases, when there is a keyframe encoded in the normal stream of a HESP stream, the corresponding keyframe may not be encoded in the companion stream. Encoding the companion stream at the full frame rate of the normal stream implies a minimum delay when switching between bitrates. It is not required that every quality or bitrate in an ABR ladder contain a companion stream at the full frame rate of the normal stream.

Most often, the playback in video streaming needs to be able to start fast on lower bitrate streams. This is practically observed in a lot of cases, where a few segments of low quality get buffered and decoded for a quick startup before it moves up to a higher quality. In addition, encoding higher quality or bitrates is often more expensive than encoding lower quality or bitrates. It is therefore advantageous to sparsely encode companion streams, with frames or versions of frames included at certain intervals. In the option of encoding sparse companion streams, the lowest bitrate can serve as the fallback when a fast start up or fast switch is desired.

With the option of Reference Picture Resampling (RPR) in Versatile Video Coding (VVC), HESP can be designed to improve the process of resolution recovery. However, in the case of streaming with the most popular Advanced Video Coding (AVC) and High Efficiency Video Coding (HEVC), switching to a lower resolution will observe that the lower quality video persists until the next key frame of a higher quality from either the companion stream or the normal stream.

This disclosure provides methods for encoding the key frames in the companion stream in HESP. Some of the solutions described herein leverage scalable coding of intra pictures (I-frames) so that fast decoding is ensured. This provides several advantages. It can avoid increasing the latency at the time of switch and avoid compromising the quality at the time of switch. With a single companion stream, the solutions described herein can be adaptive in selecting the resolution or bitrate at the time of switch based on the available bandwidth.

Ultimately, in some instances, only one companion stream exists to serve switching, at any time, for all different bitrates. One or more disclosed methods can not only reduce the storage requirements for the companion streams, but also reduce the bandwidth requirements in streaming the key frames for recovery to high resolution.

The use of scalable encoding of I-frames can also be sparse across different bitrates or resolutions, subject to the optimization for reducing the storage of bitstreams, reducing encoding costs, etc. Furthermore, the encoding/decoding of a key frame in the companion stream of high resolution can use a corresponding frame from the normal stream of a low resolution. This can avoid streaming multiple intra-coded frames in the progress of recovering to a high-resolution stream.

Systems and methods are described herein for encoding video companion streams for fast resolution recovery. In an embodiment, a source video for encoding in a video streaming protocol is received. Videos encoded in compliance with the streaming protocol may comprise, for each available resolution, a normal stream and a companion stream. Each normal stream may contain I-frames and predicted frames (e.g., P-frames and/or B-frames), with I-frames in a first normal stream encoded at a first interval corresponding to a first amount of time (e.g., every 300 frames, or for every 10 seconds of content). The first normal stream is encoded in a first resolution, which may be a low resolution (e.g., 540p). The source video may be downscaled from a native resolution to the first resolution. A second normal stream is also encoded at a second resolution higher than the first resolution (e.g., 1080p). The second resolution may be the native resolution of the source video, or the source video may be downscaled to the second resolution. A first upscaled frame is generated by upscaling a first frame from the first resolution (e.g., 540p) to the second resolution (e.g., 1080p). The first frame may be an I-frame or a predicted frame from the first normal stream (e.g., wherein the predicted frame is decoded using a previously received I-frame), or an I-frame from a first companion stream associated with the first normal stream.

Based on the first upscaled frame and a corresponding frame of the second normal stream, a residue representing a difference between the first upscaled frame and the corresponding frame of the second normal stream is generated and encoded in a second companion stream associated with the second normal stream such that, upon accessing the encoded video at a time when no I-frame is encoded in any normal stream, an output stream displays a high-resolution image based on an I-frame in the first companion stream associated with the first normal stream and the residue in the second companion stream associated with the second normal stream.

In some embodiments, the residue is encoded in the second companion stream at a second interval that is shorter than the first interval. For example, I-frames may be encoded in the first normal stream at an interval of 300 frames. Residue frames may be encoded in the second companion stream at an interval of 30 frames.

In some embodiments, the video is encoded in a third normal stream at a third resolution higher than the second resolution. A second upscaled frame is generated by upscaling the first frame of the second normal stream from the second resolution to the third resolution. Based on the second upscaled frame and the corresponding frame of the third normal stream, a residue representing a difference between the second upscaled frame and the corresponding frame of the third normal stream is generated and encoded in a third companion stream associated with the third normal stream such that, upon accessing the encoded video at a time when no I-frame is encoded in any normal stream, an output stream displays a high-resolution image based on an I-frame in the first companion stream associated with the first normal stream, the residue in the second companion stream associated with the second normal stream, and the second residue in the third companion stream associated with the third normal stream. Residue frames may be encoded in the third companion stream at an interval longer than the second interval but shorter than the first interval. For example, I-frames may be encoded in the first normal stream at an interval of 300 frames. Residue frames may be encoded in the second companion stream at an interval of 30 frames while residue frames may be encoded in the third companion stream at an interval of 60 frames.

A stream encoded in this manner may be accessed by a client device for playback. The client device may begin by requesting the first normal stream (i.e., the normal stream for the lowest available resolution) from a video source. The client device may initially request or receive the first normal stream to reduce latency in starting playback. Alternatively, the client device may initially request the highest available resolution that can be supported by current network conditions and the video source may determine which stream to transmit to the client device. If the video source receives the request at a time when no I-frame is encoded in the first normal stream, the client device receives a first frame from a first companion stream associated with the first normal stream, which may be an I-frame. The client device may begin outputting the video from this first frame. In some cases, such as packet loss causing a reduction in quality at the client device, the first frame may be a predicted frame from the first normal stream that references a previously received I-frame. To increase the playback resolution, the video source may determine if a residue corresponding to the first frame is also encoded in the second companion stream. If so, the client device receives the residue as well. The client device may also explicitly request to increase the resolution, in which response to which the video source may check for a residue in the second companion stream. The client device generates a second frame by upscaling the first frame from the first resolution to the second resolution and then adds the reside corresponding to the first frame to the second frame. The client device then generates the second frame for output. Subsequently, the client device receives the second normal stream from the video source.

If the video source determines that a second residue is encoded in the third companion stream, the client device may also receive the second residue. The client device may then add the second residue to the second frame to generate a frame at the resolution of the third normal stream. In some cases, the second residue is not encoded at the same frame as the first residue. The client device may receive the second residue concurrently with a frame of the second normal stream subsequent to the first frame. The client device may then upscale the corresponding frame from the second normal stream to the resolution of the third normal stream and add to it the residue from the third companion stream to generate a frame at the resolution of the third normal stream. That frame is then generated for output, and the client device requests the third normal stream from the video source.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
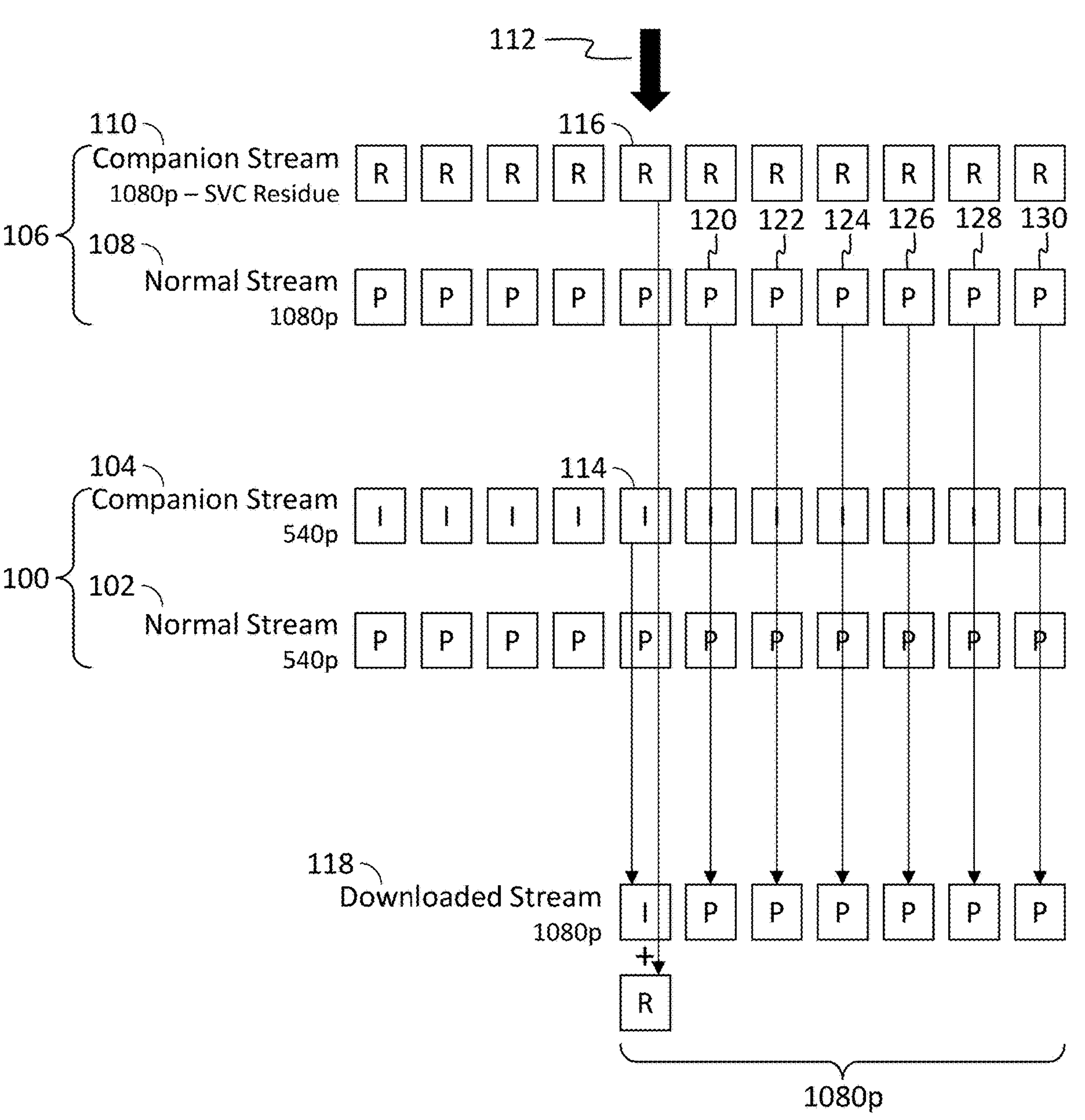
FIG. 1 depicts an illustrative example of a HESP stream in which a residue is encoded in a high-resolution companion stream and a downloaded high-resolution stream, in accordance with some embodiments of the disclosure.

FIG. 1 depicts an illustrative example of a HESP stream in which a residue is encoded in a high-resolution companion stream and a downloaded high-resolution stream, in accordance with some embodiments of the disclosure. In this example, the video content is encoded in 540p (low resolution) stream 100. Stream 100 includes normal stream 102, in which the video is encoded in long groups of pictures (GOPs) with long intervals between I-frames, and companion stream 104, in which a series of I-frames is encoded at either the full 540p resolution or a lower resolution. Lower resolution I-frames may be upscaled to 540p and used in place of a true 540p I-frame until an I-frame appears in the normal stream. The video content is also encoded in 1080p (high resolution) stream 106. Stream 106 includes normal stream 108, in which the video is encoded in long GOPs as in normal stream 102, and companion stream 110, in which residue frames representing the difference between 1080p upscales of 540p frames and native 1080p frames are encoded. The residue frames in 1080p companion stream 110 are subject to scalable coding with reference to I-frames in 540p companion stream 104 as the base layer. At time 112 at which the client device accesses the stream, if there is sufficient bandwidth for streaming 1080p, I-frame 114 from the 540p companion stream 104 and residue frame 116 from the 1080p companion stream 110 are both delivered to the client device for the first frame of downloaded stream 118. The client device may then reconstruct an I-frame having 1080p resolution based on 540p I-frame 114 and 1080p residue frame 116. Subsequent frames 120-130 are then streamed from the 1080p normal stream 102.

Figure 2:
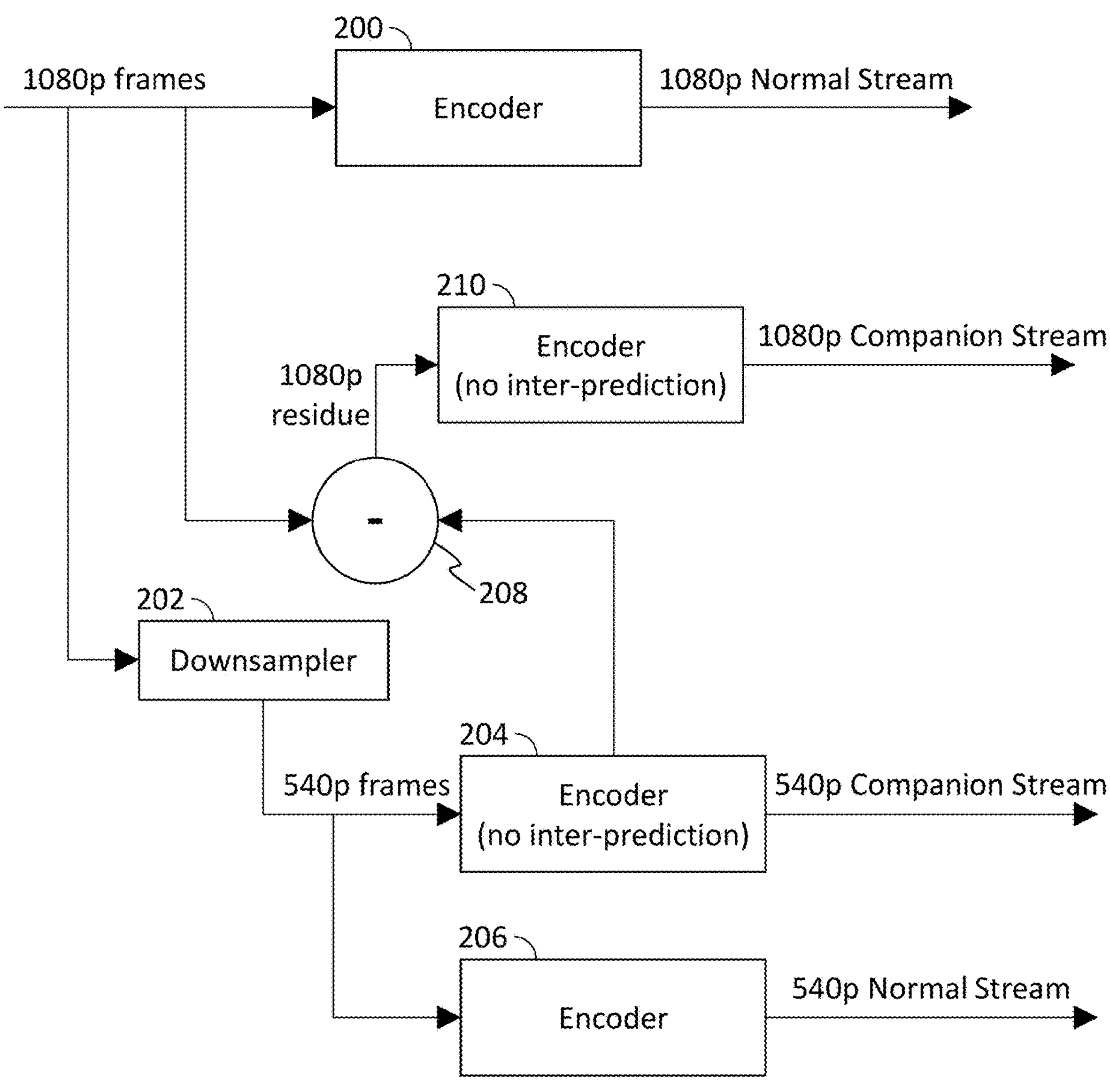
FIG. 2 depicts an illustrative example of an encoding a HESP stream to enable fast high-resolution startup, in accordance with some embodiments of the disclosure.

FIG. 2 depicts an illustrative example of an encoding a HESP stream to enable fast high-resolution startup, in accordance with some embodiments of the disclosure. Encoder 200 receives raw, or uncompressed, 1080p video and encodes each frame as either an I-frame, a P-frame, or a B-frame, in accordance with any suitable encoder settings. Encoder 200 thus generates a 1080p normal stream. The raw 1080p view is scaled to 540p resolution using downsampler 202. Encoder 202 receives the downsampled 540p video and encodes each frame as an I-frame to generate a 540p companion stream, while encoder 204 encodes each frame of the raw 540p video into either an I-frame, a P-frame, or a B-frame thereby producing a 540p normal stream. 540p I-frames produced by encoder 202 are also fed into video processor 206, along with corresponding frames from the raw 1080p video. Video processor 206 upscales a 540p I-frame to 1080p and subtracts the video data encoded in the upscaled I-frame from the video data of a corresponding native 1080p video frame to produce a 1080p residue frame. The 1080p residue frame is fed into encoder 208 to produce the 1080p companion stream. The encoding processes in FIG. 2 generate the normal and companion streams for both 540p and 1080p resolutions. In this example, the residue of 1080p is derived with reference to the upscaled key frames from the 540p companion stream. This reference can be changed to the upscaled frames from the 540p Normal stream. There is also flexibility by setting the 1080p residue stream to a minimum stream (i.e., by setting the residue to all zeros). Following the scalable decoding of AVC or HEVC, it essentially represents a reference frame of 1080p that is upscaled from 540p. This enables the reference picture resampling that exists in the later VVC only.

Figure 3:
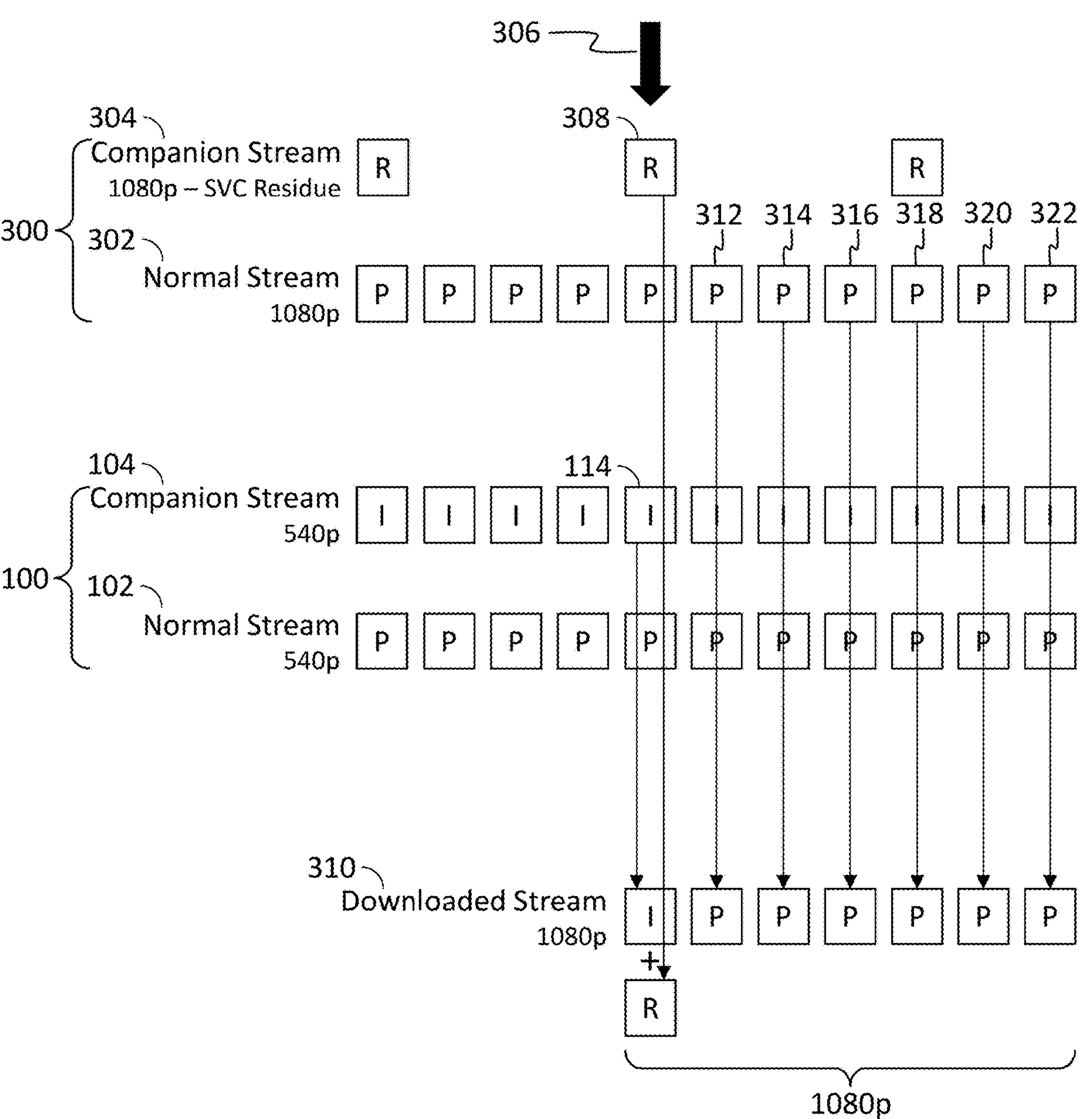
FIG. 3 depicts an illustrative example of a HESP stream in which a residue is periodically encoded in a high-resolution companion stream and a downloaded stream beginning from a frame for which a residue is encoded, in accordance with some embodiments of the disclosure.

FIG. 3 depicts an illustrative example of a HESP stream in which a residue is periodically encoded in a high-resolution companion stream and a downloaded stream beginning from a frame for which a residue is encoded, in accordance with some embodiments of the disclosure. As in the example of FIG. 1, the video content is encoded in 540p (low resolution) stream 100, including normal stream 102 and companion stream 104. The video content is also encoded in 1080p (high resolution) stream 300. Stream 300 includes normal stream 302, in which the video is encoded in long GOPs as in normal stream 102, and companion stream 304, in which residue frames representing the difference between 540p and 1080p frames are encoded for some frames. In the example of FIG. 3, residue frames are encoded in companion stream 304 every 4 frames. This interval may be any size less than the interval between I-frames in the 1080p normal stream. The residue frames in 1080p companion stream 304 are subject to scalable coding with reference to I-frames in 540p companion stream 104 as the base layer. At time 306 at which the client device accesses the stream, if there is sufficient bandwidth for streaming 1080p, I-frame 114 from the 540p companion stream 104 and residue frame 308 from the 1080p companion stream 304 are both delivered to the client device for the first frame of downloaded stream 310. The client device may then reconstruct an I-frame having 1080p resolution based on 540p I-frame 114 and 1080p residue frame 308. Subsequent frames 312-322 are then streamed from 1080p normal stream 102.

Figure 4:
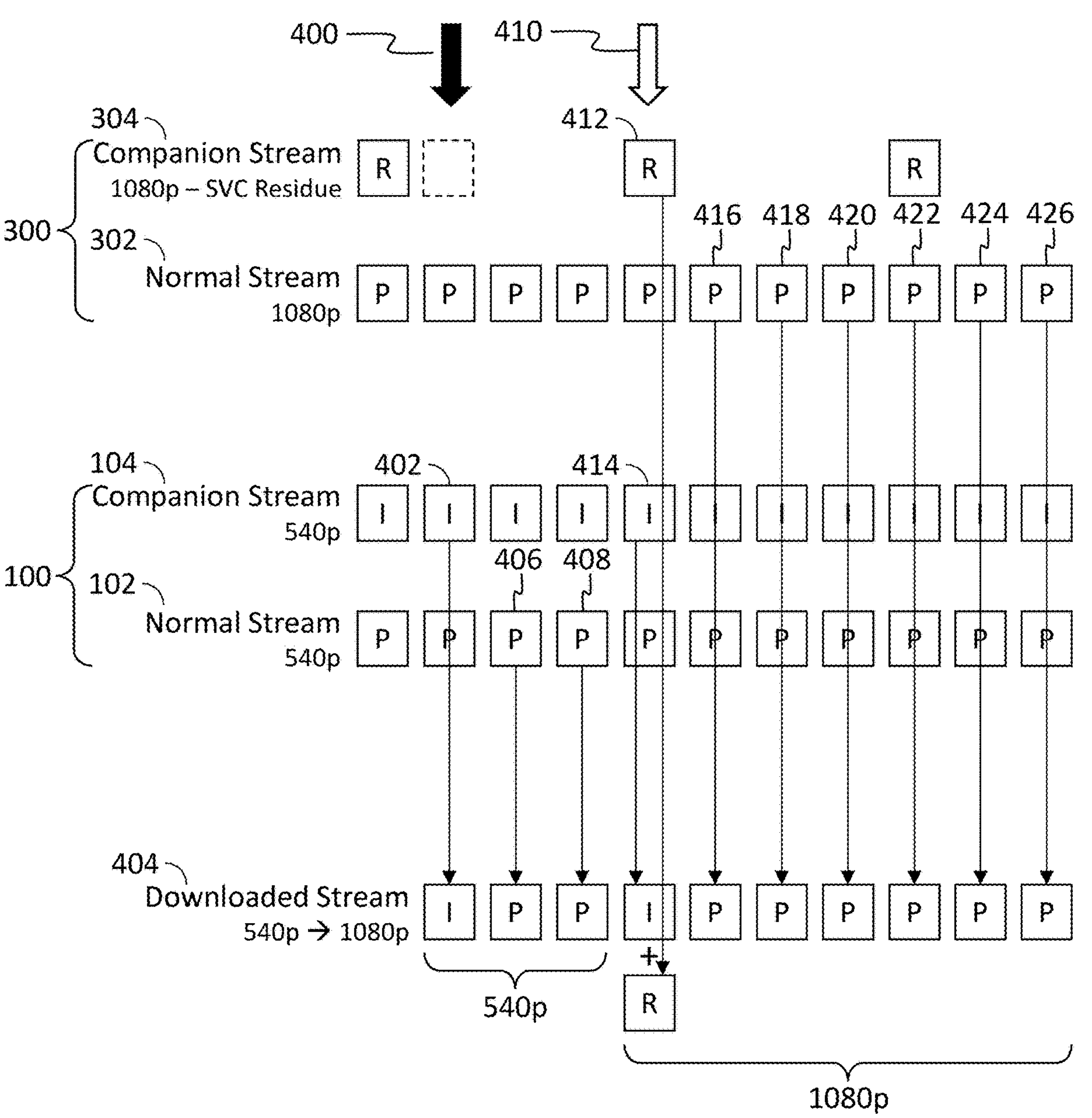
FIG. 4 depicts an illustrative example of a HESP stream in which a residue is periodically encoded in a high-resolution companion stream and a downloaded stream beginning from a frame for which no residue is encoded, in accordance with some embodiments of the disclosure.

FIG. 4 depicts an illustrative example of a HESP stream in which a residue is periodically encoded in a high-resolution companion stream and a downloaded stream beginning from a frame for which no residue is encoded, in accordance with some embodiments of the disclosure. As in the example of FIG. 3, the video content is encoded in 540p (low resolution) stream 100, including normal stream 102 and companion stream 104. The video content is also encoded in 1080p (high resolution) stream 300, including normal stream 302 and companion stream 304. At time 400 at which the client device accesses the stream, if there is sufficient bandwidth for streaming 1080p, the client device may attempt to download 1080p content by first downloading I-frame 402 from 540p companion stream 104. However, no residue frame is encoded in 1080p companion stream 304 at time 400. Downloaded stream 404 therefore only contains 540p I-frame 402. Subsequent frames 406 and 408 are streamed from 540p normal stream 102 until there is a residue frame present in 1080p companion stream 304. At time 410, residue frame 412 is detected in 1080p companion stream 304. Corresponding 540p I-frame 414 is then delivered to the client device along with reside frame 412. The client device may then reconstruct an I-frame having 1080p resolution. Subsequent frames 416-426 are then streamed from 1080p normal stream 302.

Figure 5:
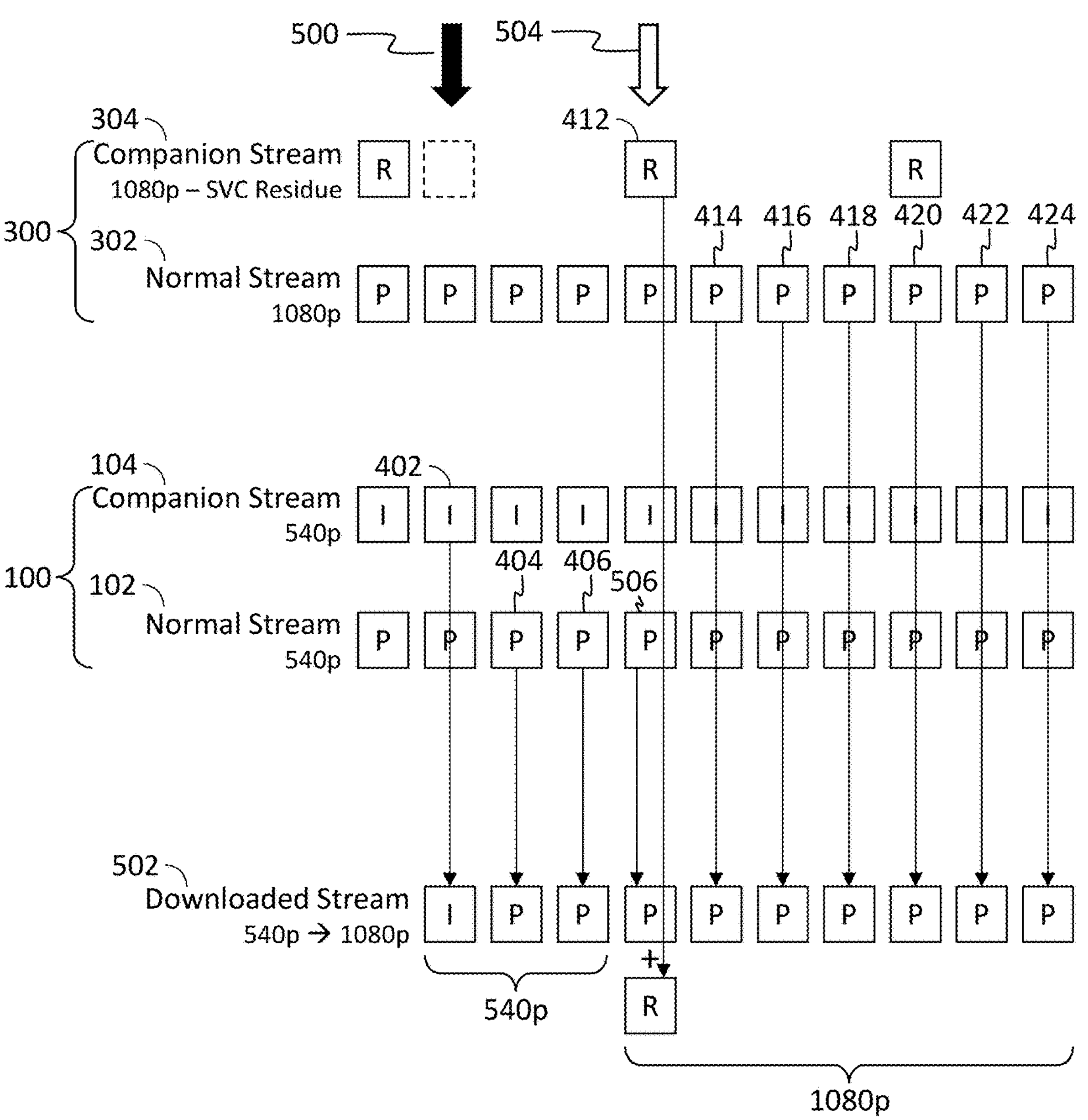
FIG. 5 depicts a second illustrative example of a HESP stream in which a residue is periodically encoded in a high-resolution companion stream and a downloaded stream beginning from a frame for which no residue is encoded, in accordance with some embodiments of the disclosure.

FIG. 5 depicts a second illustrative example of a HESP stream in which a residue is periodically encoded in a high-resolution companion stream and a downloaded stream beginning from a frame for which no residue is encoded, in accordance with some embodiments of the disclosure. As in the example of FIGS. 3 and 4, the video content is encoded in 540p (low resolution) stream 100, including normal stream 102 and companion stream 104. The video content is also encoded in 1080p (high resolution) stream 300, including normal stream 302 and companion stream 304. At time 500 at which the client device accesses the stream, if there is sufficient bandwidth for streaming 1080p. the client device may attempt to download 1080p content by first downloading I-frame 402 from 540p companion stream 104. However, no residue frame is encoded in 1080p companion stream 304 at time 500. Downloaded stream 502 therefore only contains 540p I-frame 402. Subsequent frames 406 and 408 are streamed from 540p normal stream 102 until there is a residue frame present in 1080p companion stream 304. At time 504, residue frame 412 is detected in 1080p companion stream 304. Corresponding 540p P-frame 506 is then delivered to the client device along with residue frame 412. The client device may then reconstruct a P-frame having 1080p resolution. Subsequent frames 416-426 are then streamed from 1080p normal stream 302.

Figure 6:
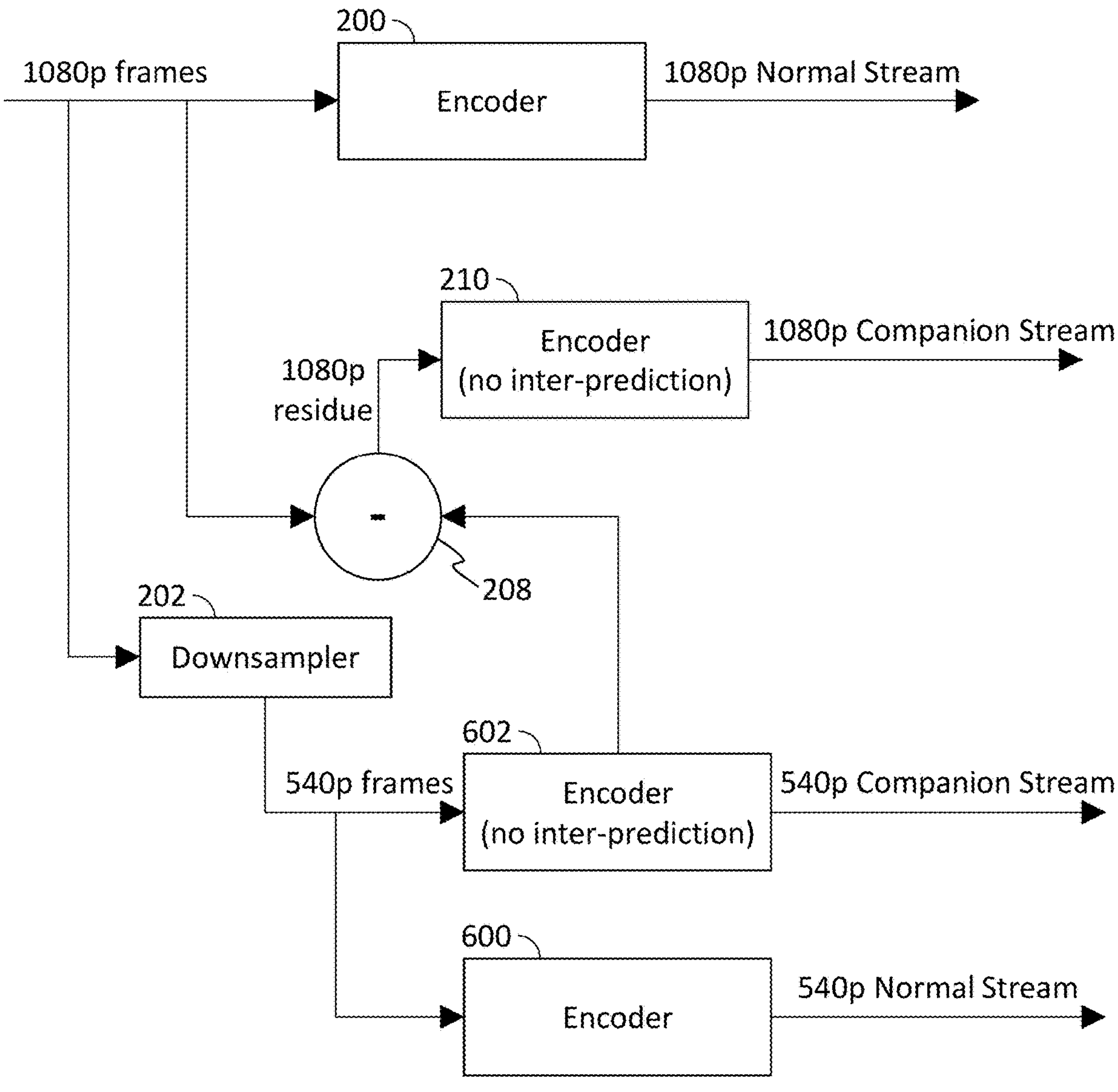
FIG. 6 depicts a second illustrative example of an encoding a HESP stream to enable fast high-resolution startup, in accordance with some embodiments of the disclosure.

FIG. 6 depicts a second illustrative example of an encoding a HESP stream to enable fast high-resolution startup, in accordance with some embodiments of the disclosure. As in FIG. 2, encoder 200 receives raw 1080p video and encodes each frame as either an I-frame, a P-frame, or a B-frame, in accordance with any suitable encoder settings. Encoder 200 thus generates a 1080p normal stream. The raw 1080p video is scaled to 540p resolution using downsampler 202. Encoder 600 receives the downsampled 540p video and encodes each frame as an I-frame to generate a 540p companion stream, while encoder 602 encodes each frame of the raw 540p video into either an I-frame, a P-frame, or a B-frame thereby producing a 540p normal stream. 540p frames encoded by encoder 602 are also fed into video processor 206, along with corresponding frames from the raw 1080p video. Video processor 206 subtracts the video data encoded in a 540p frame from the video data of a corresponding raw 1080p video frame to produce a 1080p residue frame. The 1080p residue frame is fed into encoder 208 to produce the 1080p companion stream.

Figure 7:
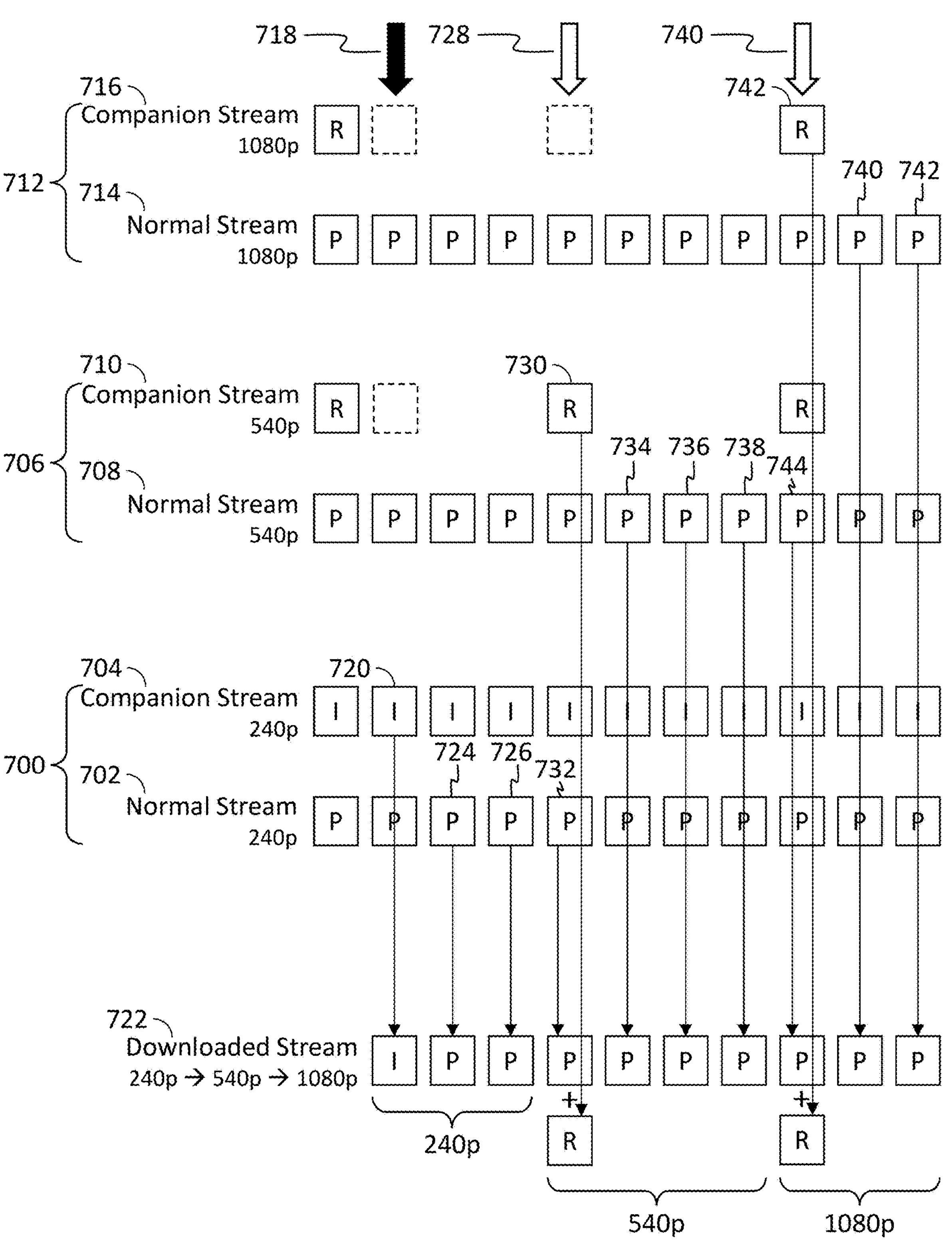
FIG. 7 depicts an illustrative example of a HESP stream encoding three different resolutions and in which a residue between a low-resolution frame and a medium-resolution frame is periodically encoded in a medium-resolution companion stream at a first interval, a residue between the medium-resolution frame and a high-resolution frame is periodically encoded in a high-resolution companion stream at a second interval, and a downloaded stream beginning from a frame for which no residue is encoded, in accordance with some embodiments of the disclosure.

FIG. 7 depicts an illustrative example of a HESP stream encoding three different resolutions and in which a residue between a low-resolution frame and a medium-resolution frame is periodically encoded in a medium-resolution companion stream at a first interval, a residue between the medium-resolution frame and a high-resolution frame is periodically encoded in a high-resolution companion stream at a second interval, and a downloaded stream beginning from a frame for which no residue is encoded, in accordance with some embodiments of the disclosure. In the example of FIG. 7, three different resolutions are available for the video content. The client device uses a "resolution ladder" to output the highest possible resolution, combining data from the lowest resolution I-frame with a residue from the medium resolution to and a residue from the highest resolution to reconstruct the highest resolution frame. The video content is encoded in 240p (lowest resolution) stream 700. Stream 700 includes normal stream 702, in which the video is encoded in long groups of pictures (GOPs) with long intervals between I-frames, and companion stream 704, in which a series of I-frames is encoded. The video content is also encoded in 540p (medium resolution) stream 706. Stream 706 includes normal stream 708, in which the video is encoded in long GOPs as in normal stream 702, and companion stream 710, in which residue frames representing the difference between 240p and 540p frames are encoded. The residue frames in 540p companion stream 710 are subject to scalable coding with reference to I-frames in 240p companion stream 704 as the base layer. The video content is also encoded in 1080p (highest resolution) stream 712. Stream 712 includes normal stream 714, in which the video is encoded in long GOPs as in normal stream 702, and companion stream 716, in which residue frames representing the difference between 540p and 1080p frames are encoded. The residue frames in 1080p companion stream 716 are subject to scalable coding with reference to I-frames in 540p companion stream 710 as the base layer.

At time 718 at which the client device accesses the stream, if there is sufficient bandwidth for streaming 1080p, the client device may attempt to download 1080p content by first downloading I-frame 720 from the 240p companion stream 704. However, no residue frame is encoded in 540p companion stream 710 at time 718. Downloaded stream 722 therefore only contains 240p I-frame 720. Subsequent frames 724 and 726 are streamed from 240p normal stream 702 until there is a 540p residue frame present in 540p companion stream 710. At time 728, 540p residue frame 730 is detected in 540p companion stream 710. Corresponding 240p P-frame 732 (or a corresponding I-frame from 240p companion stream 704) is then delivered to the client device along with 540p residue frame 730. The client device may then reconstruct a P-frame (or an I-frame) having 540p resolution. Subsequent frames 734-738 are then streamed from the 540p normal stream 708 until there is a 1080p residue frame in 1080p companion stream 716. At time 740, 1080p residue frame 742 is detected in 1080p companion stream 716. Corresponding 540p P-frame 744 is then delivered to the client device along with 1080p residue frame 742. The client device may then reconstruct a P-frame having 1080p resolution. Subsequent frame 740 and 742 are then streamed from 1080p normal stream 714.

Figure 8:
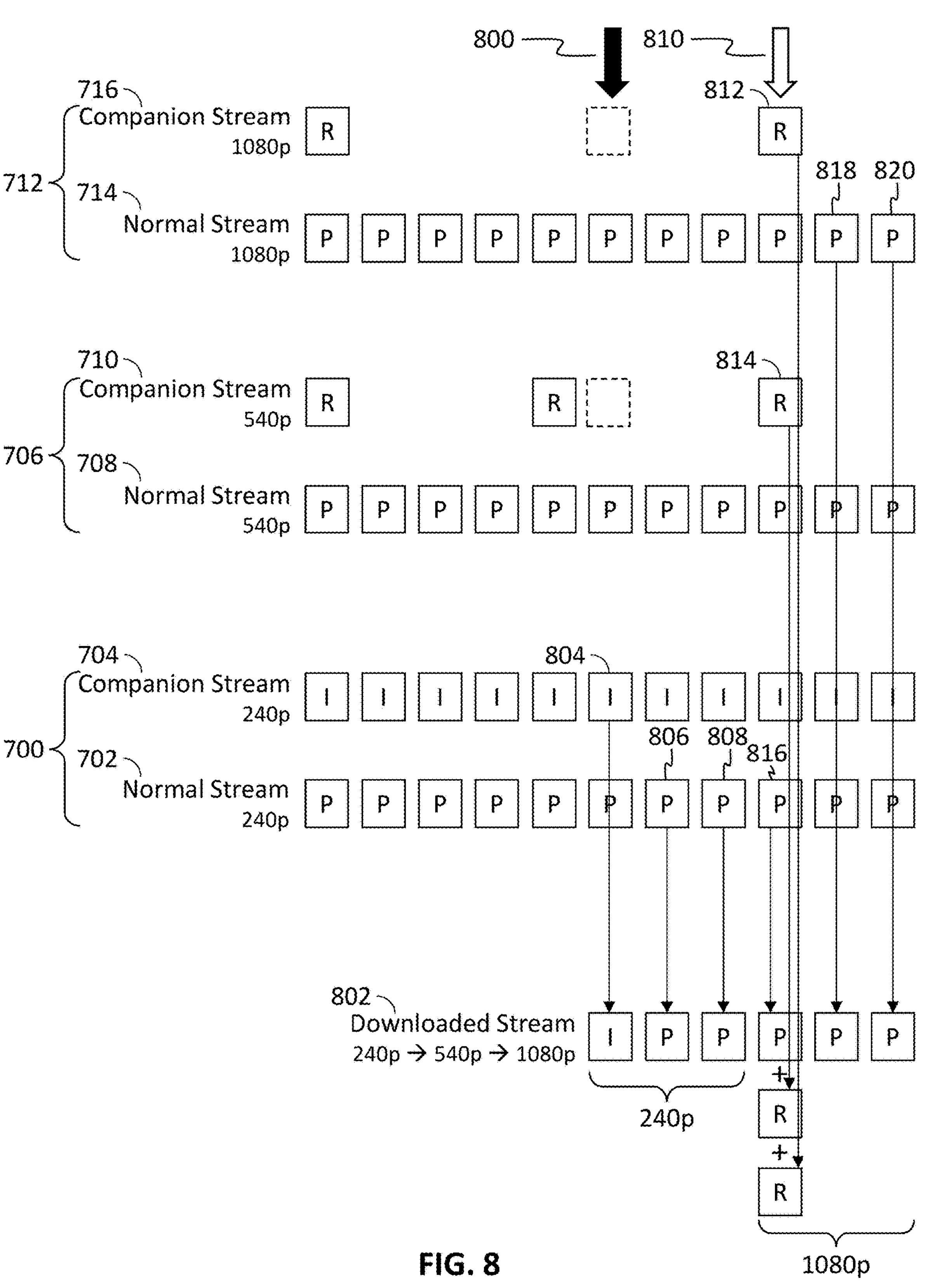
FIG. 8 depicts a second illustrative example of a HESP stream encoding three different resolutions and in which a residue between a low-resolution frame and a medium-resolution frame is periodically encoded in a medium-resolution companion stream at a first interval, a residue between the medium-resolution frame and a high-resolution frame is periodically encoded in a high-resolution companion stream at a second interval, and a downloaded stream beginning from a frame for which no residue is encoded, in accordance with some embodiments of the disclosure.

FIG. 8 depicts a second illustrative example of a HESP stream encoding three different resolutions and in which a residue between a low-resolution frame and a medium-resolution frame is periodically encoded in a medium-resolution companion stream at a first interval, a residue between the medium-resolution frame and a high-resolution frame is periodically encoded in a high-resolution companion stream at a second interval, and a downloaded stream beginning from a frame for which no residue is encoded, in accordance with some embodiments of the disclosure. As in the example of FIG. 7, the video content is encoded in 240p (lowest resolution) stream 700, including normal stream 702 and companion stream 704, 540p (medium resolution) stream 706, including normal stream 708 and companion stream 710, and 1080p (highest resolution) stream 712, including normal stream 714 and companion stream 716. In the example of FIG. 8, the client device accesses the stream at time 800, at which no residue frame is available in 540p companion stream 710. Downloaded stream 802 therefore contains only 240p I-frame 804 from 240p companion stream 704. Subsequent 240p frames 806 and 808 are then streamed from 240p normal stream 702. At time 810, 1080p residue frame 812 is detected in 1080p companion stream 716 and 540p residue frame 814 is detected in 540p companion stream 710 and 1080p companion stream 716. The corresponding 240p P-frame 816 (or corresponding I frame from 240p companion stream 704) is then delivered to the client device along with both residue frames 812 and 814. The client device may then reconstruct a frame having 1080p resolution based on these frames. Subsequent frames 818 and 820 are then streamed from 1080p normal stream 716.

Figure 9:
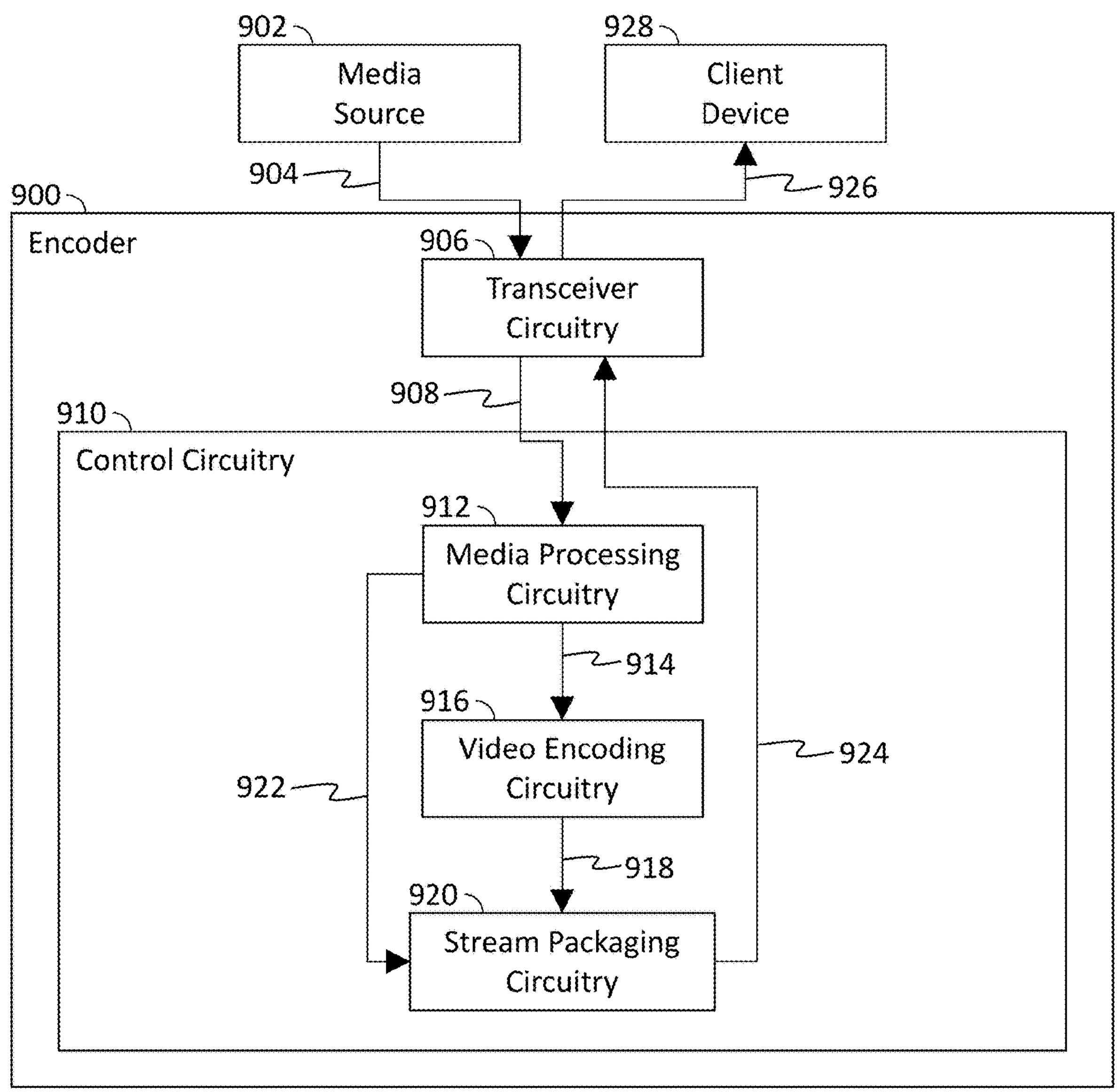
FIG. 9 is a block diagram representing components and data flow therebetween of an illustrative media encoder for encoding a HESP stream, in accordance with some embodiments of the disclosure.

FIG. 9 is a block diagram representing components and data flow therebetween of an illustrative media encoder 900 for encoding a HESP stream, in accordance with some embodiments of the disclosure. Media source 902 provides 904 content to encoder 900 to be encoded in a HESP stream. The content provided by media source 902 may be a raw media stream or a media stream encoded in any suitable streaming format. In some embodiments, media source 902 is a live media source, such as a live broadcast of a sporting event.

Encoder 900 receives the content using transceiver circuitry 906. Transceiver circuitry 906 may comprise a data bus connection or physical data connection port (e.g., USB). Transceiver circuitry 906 may also comprise a network connection over which data ban be transmitted to an received from remote devices, such as an Ethernet connection, Wi-Fi connection, mobile broadband interface, or connection employing any other suitable network protocol. Transceiver circuitry 906 in turn transmits 908 the received content to control circuitry 910, where it is received using media processing circuitry 912.

Control circuitry 910 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 912 processes the received content for encoding into a HESP stream. Media processing circuitry 912 separates video data from audio data. Media processing circuitry 912 decodes each frame of video data into a format from which the HESP stream can be encoded. For example, encoder 900 may be configured to encode raw video into the HESP stream while the content is received in an H.264 stream. Media processing circuitry 912 may decode each frame of video from the H.264 stream to generate full resolution video frames that do not rely on prediction from other frames (i.e., I-frames). The decoded video frames are transmitted 914 to video encoding circuitry 916.

Video encoding circuitry 916 encodes each frame of video into either an I-frame, a P-frame, or a B-frame, as determined by the settings of the encoder. Video encoding circuitry 916 encodes the video in different resolutions. For the lowest resolution, e.g., 540p, video encoding circuitry 916 encodes a normal stream and a companion stream. The settings of the encoder may include a first time interval for I-frames to be included in the normal stream. For example, the encoder may be configured to include an I-frame in the normal stream every ten seconds. For a 30 fps video, this results in an I-frame spacing of 300 frames. For a higher resolution, e.g., 1080p, video encoding circuitry 916 generates a residual frame representing the difference in encoded data between the lowest resolution frame and the corresponding 1080p frame.

To generate a residual frame, video encoding circuitry 916 upscales the low-resolution frame to the higher resolution. Video encoding circuitry 916 then subtracts the color information for each pixel in the upscaled frame from the color information for its respective corresponding pixel in the high-resolution frame. The value of each color component may be subtracted separately. In some embodiments, red, green, and blue components are used, while in other embodiments, YCbCr or YUV values are used.

Video processing circuitry 916 then encodes the residual frame in the 1080p companion stream. The encoder may be further configured to include a residual frame at a second interval, such as every half-second, resulting in a spacing of 15 frames. If a third resolution higher than 1080p is also to be encoded (e.g., 4K), video processing circuitry 916 generates residual frames representing the difference between a 1080p frame and the corresponding 4K frame.

Video encoding circuitry 916 then transmits 918 each encoded frame and each resolution to stream packaging circuitry 920. Media processing circuitry 912 may also transmit 922 audio data from the content provided by media source 900 to stream packaging circuitry 920. Stream packaging circuitry 920 constructs a HESP stream from these inputs. The stream is transmitted 924 to transceiver circuitry 906, which in turn transmits 926 the stream to, for example, client device 928.

Figure 10:
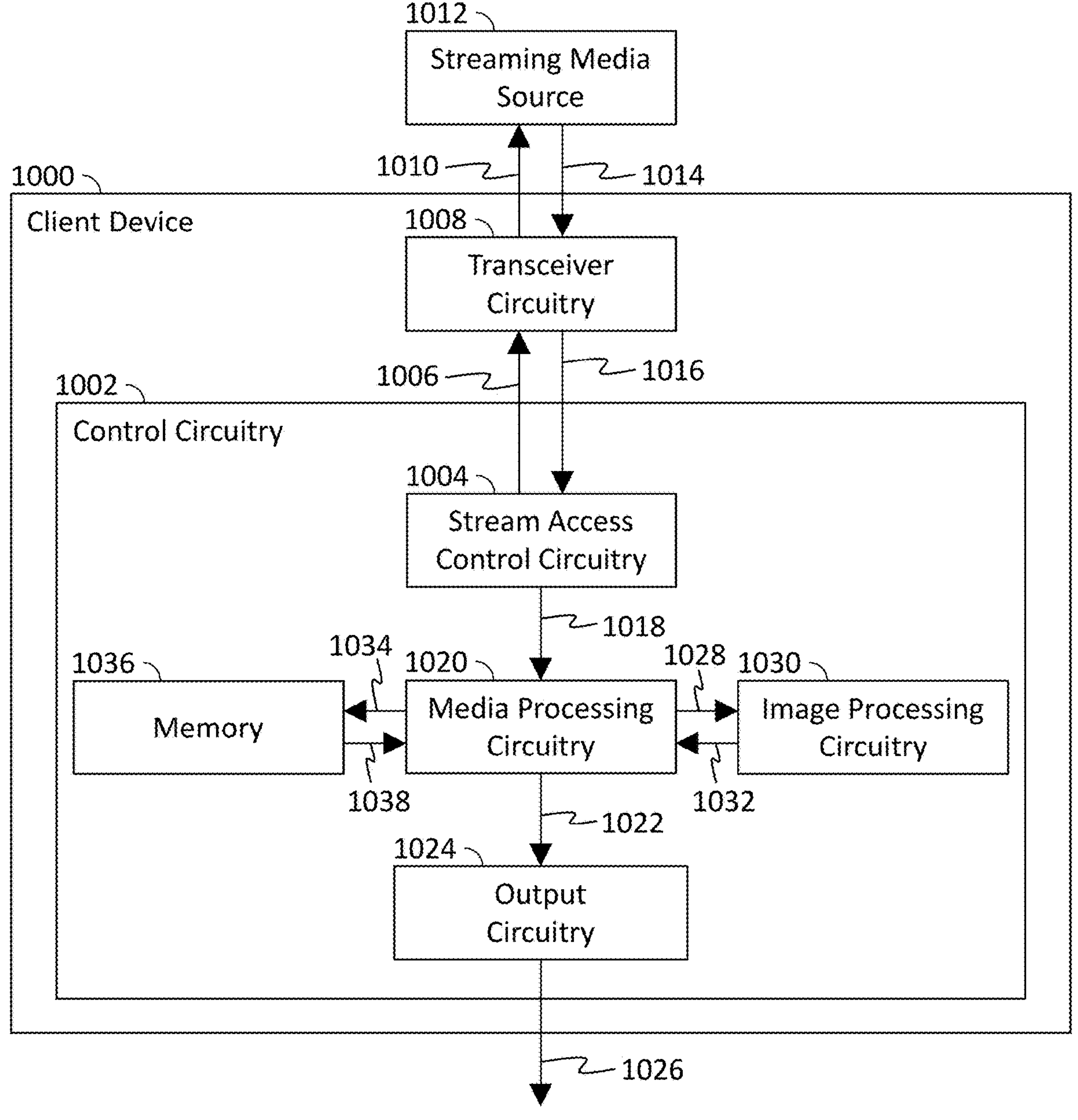
FIG. 10 is a block diagram representing components and data flow therebetween on an illustrative client device configured to decode a HESP stream in which residues are encoded, in accordance with some embodiments of the disclosure.

FIG. 10 is a block diagram representing components and data flow therebetween on an illustrative client device 1000 configured to decode a HESP stream in which residues are encoded, in accordance with some embodiments of the disclosure. Control circuitry 1002 of client device 1000 accesses a media stream using stream access control circuitry 1004. Control circuitry 1002 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Stream access control circuitry 1004 controls access to one or more media streams. For example, stream access control circuitry 1004 initiates a request to access a specific media stream. The request is transmitted 1006 to transceiver circuitry 1008. Transceiver circuitry 1008 may comprise a data bus connection or physical data connection port (e.g., USB). Transceiver circuitry 1008 may also comprise a network connection over which data ban be transmitted to an received from remote devices, such as an Ethernet connection, Wi-Fi connection, mobile broadband interface, or connection employing any other suitable network protocol. Transceiver circuitry 1008 transmits 1010 the request to streaming media source 1012. The request may indicate a maximum video resolution that can be supported by client device 1000 and/or current network conditions between client device 1000 and streaming media source 1012. Streaming media source 1012 may be a content server or an edge server that hosts the requested stream. In some embodiments, streaming media source 1012 may be an encoder, such as encoder 900.

Streaming media source 1012 verifies the identity of client device 1000 or a user of client device 1000 attempting to access the stream. This may be accomplished through authentication mechanisms such as username-password authentication, OAuth tokens, API keys, or other forms of credentials. Upon successful authentication, streaming media source 1012 checks if the authenticated entity (i.e., client device 1000 or a user of client device 1000) is authorized to access the requested media stream. Authorization can be based on various factors such as subscription status, geographic location, user permissions, or any other factor. If authentication and authorization are successful, streaming media source 1012 establishes a session with client device 1000, allowing for the continuous transmission of data (i.e., the media stream) during the session.

Once the session is established, streaming media source 1012 begins transmitting 1014 the media stream data to client device 1000. Streaming media source 1012 may determine, based on the resolution indicated in the request, whether to transmit any residue frames to client device 1000. For example, if the video content is encoded in 540p and 1080p and the request indicates 1080p, streaming media source 1012 may select a 540p I-frame from the 540p companion stream for transmission. Streaming media source 1012 may also determine whether a residue frame corresponding to the selected 540p I-frame is available in the 1080p companion stream. If so, streaming media source 1012 may also select the residue frame for transmission to client device 1000. Streaming media source 1012 then selects all subsequent frames from the 1080p normal stream until a change of resolution request is received from client device 1000. In some implementations, a manifest file is transmitted to client device 1000 indicated which 540p frames have corresponding 1080p residue frames. Client device 1000 may then request the frames as needed. For example, client device 1000 may request a 540p I-frame in order to begin outputting content. Client device 100 may then request a next available residue frame from the 1080p companion stream and begin requesting all subsequent frames from the 1080p normal stream. Client device 1000 receives the media stream using transceiver circuitry 1008, which in turn transmits 1016 the media stream to stream access control circuitry 1004. This may be done to maintain the session between client device 1000 and streaming media source 1012.

Stream access control circuitry 1004 transmits 1018 the received media stream to media processing circuitry 1020. Media processing circuitry 1020 decodes the media stream for output. Under normal operating conditions, media processing circuitry 1020 decodes frames from the normal stream only. The decoded frames, along with associated audio data, are transmitted 1022 to output circuitry 1024 for output 1026 to a user. Output circuitry 1024 may include video drivers and/or audio drivers for controlling output devices such as screens, speakers, volumetric displays, etc.

When a residue frame is received, media processing circuitry 1020 transmits 1028 the residue frame and the corresponding I-frame or P-frame to image processing circuitry 1030. Image processing circuitry 1030 reconstructs an I-frame or P-frame based on the residue frame and the corresponding frame. To reconstruct the frame, image processing circuitry 1030 upscales the low-resolution frame to the higher resolution for which the residue is encoded. Image processing circuitry 1030 then adds to the color information of each pixel of the upscaled frame the color information from its respective corresponding pixel in the residue frame. As described above, RGB, YCbCr, or YUV values may be used. The reconstructed frame is then transmitted 1032 to media processing circuitry 1020, which then outputs the reconstructed frame.

I-frames decoded by media processing circuitry 1020 may be transmitted 1034 to memory 1036 and stored in a reference picture buffer. Memory 1036 may be any suitable electronic storage device such as random-access memory, read-only memory, hard drives, optical drives, solid state drives, quantum storage devices, or any other suitable fixed or removeable storage devices, and/or any combination of the same. The stored I-frame may be used as a reference for decoding other frames until a new I-frame is received.

Figure 11:
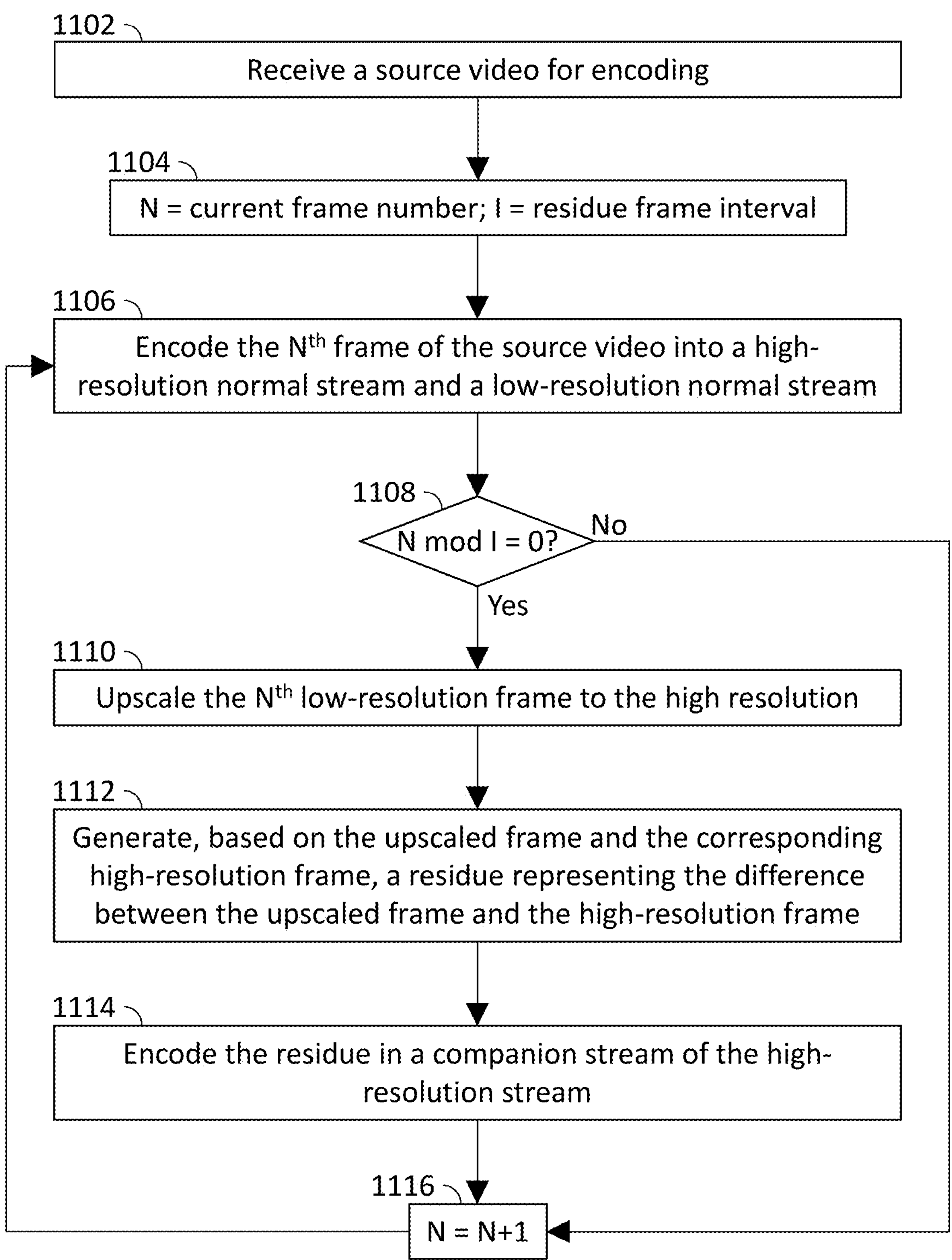
FIG. 11 is a flowchart representing an illustrative process for encoding a HSEP stream with residues, in accordance with some embodiments of the disclosure.

FIG. 11 is a flowchart representing an illustrative process 1100 for encoding a HESP stream with residues, in accordance with some embodiments of the disclosure. Process 1100 may be implemented on control circuitry 910. In addition, one or more actions of process 1100 may be incorporated into or combined with one or more actions of any other process or embodiments described herein.

At 1102, control circuitry 910 receives a source video for encoding. The source video may be in any suitable format, including raw video from a live feed, an MPEG-2 transport stream, and H.264 stream, an H.265 stream, or any other format. Control circuitry 910 may determine a resolution of the source video. Based on the resolution of the source video, control circuitry 910 may select a set of resolutions in which to encode the video. In some implementations, the resolution of the source video may be the maximum resolution selected by control circuitry 910. For example, if the source video is in 4K resolution, control circuitry 910 may select 240p, 540p, 1080p, and 4K resolutions for encoding the video while only selecting 240p, 540p, and 1080p for a source video having 1080p resolution. In other implementations, control circuitry 910 may employ an upscaling algorithm, such and reference picture resampling, to generate versions of the source video at higher resolutions. For example, a source video having 1080p resolution may be upscaled to 4K resolution, allowing control circuitry 910 to encode the video at 4K resolution in addition to 240p, 540p, and 1080p. For ease of discussion, the example of FIG. 11 describes encoding of the source video into only two resolutions.

At 1104, control circuitry 910 initializes a counter variable N, setting its initial value to one, and a variable I representing an integer frame interval at which to encode residue frames in a companion stream. At 1106, control circuitry 910 encodes the video into a high-resolution normal stream (e.g., at the same resolution as the source video) and a low-resolution normal stream. Control circuitry 910 may downscale the source video to generate the low-resolution normal stream.

At 1108, control circuitry 910 determines whether N mod I is equal to zero, meaning that N is an integer multiple of I and, therefore, that the appropriate interval has passed. For example, if the interval is 30 frames and the current frame number is 90, then the interval number of frames has passed and the current frame is one for which a residue frame is to be encoded. Process 1100 assumes an even spacing of residue frames. It should be noted, however, that the spacing may not always be even. For example, the presence of an I-frame in the normal stream may reset the interval at which residue frames are encoded in the companion stream. A scene change in the source video may cause an I-frame to be encoded earlier that the long-GOP interval would otherwise dictate. If an I-frame is present, control circuitry 910 may restart an interval counter (e.g., reset the value of N to one), such that residue frames are spaced relative to the I-frame.

If N is an integer multiple of I ("Yes" at 1108), then, at 1110, control circuitry 910 upscales the $N^{th}$ low-resolution frame to the high resolution. This may be accomplished using reference picture resampling or any other suitable upscaling technique. At 1112, control circuitry 910 generates, based on the upscaled $N^{th}$ frame and the $N^{th}$ high-resolution frame, a residue representing the different between the upscaled frame and the high-resolution frame. For example, control circuitry 910 retrieves, for each pixel in the upscaled $N^{th}$ frame, a color value or set of color values (e.g., RGB, YCbCr, or YUV values). Control circuitry 910 also retrieves color values for each pixel of the $N^{th}$ high-resolution frame. Control circuitry 910 then subtracts the color values of each pixel in the $N^{th}$ upscaled frame from the color values of its respective corresponding pixel in the $N^{th}$ high-resolution frame. The resulting values are then encoded in the residual frame.

At 1114, control circuitry 910 encodes the residue as a frame in a companion stream of the high-resolution stream. After encoding the residue in the companion stream, or if N is not an integer multiple of I ("No" at 1108), at 1116, control circuitry 910 increments the value of N by one and processing returns to 1106, as which control circuitry 910 encodes the next frame of the source video into low- and high-resolution normal streams.

The actions and descriptions of FIG. 11 may be used in any other embodiment of this disclosure. In addition, the actions and descriptions described in relation to FIG. 11 may be done in suitable alternative orders or in parallel to further the purposes of this disclosure.

In some embodiments, the upscaling of the $N^{th}$ low-resolution frame described above may be skipped, and the residue frame may be generated based on the difference between the low- and high-resolution versions of the $N^{th}$ frame. This reduces the processing power needed by the client device, in that the client device need not perform any upscaling of the low-resolution frame before using the residue to reconstruct the high-resolution frame. However, this also increases the amount of data encoded in each residue frame, thereby increasing the bandwidth needed to retrieve a residue frame.

Figure 12:
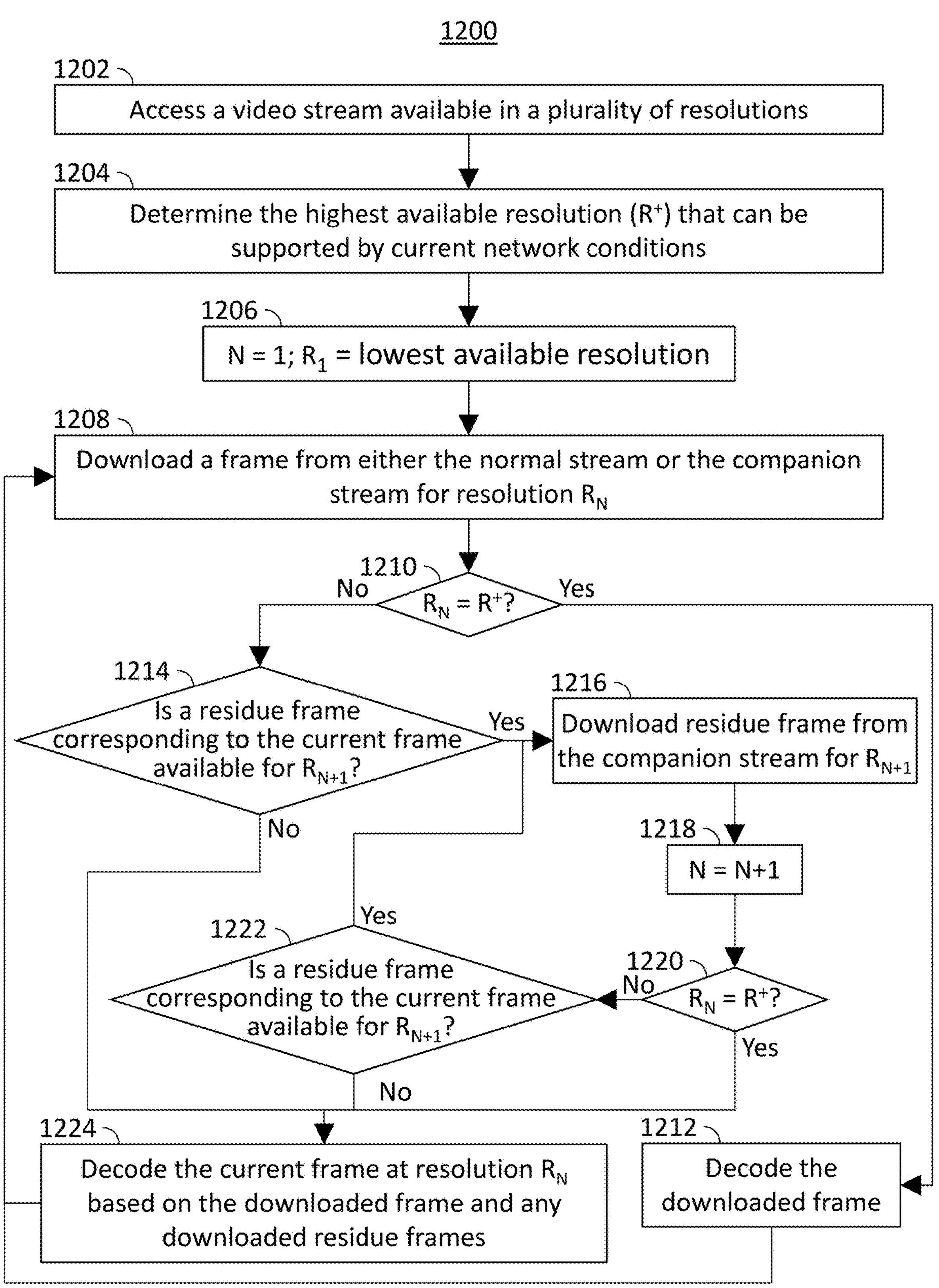
FIG. 12 is a flowchart representing an illustrative process for decoding a HESP stream with residues, in accordance with some embodiments of the disclosure.

FIG. 12 is a flowchart representing an illustrative process 1200 for decoding a HESP stream with residues, in accordance with some embodiments of the disclosure. Process 1200 may be implemented on control circuitry 1010. In addition, one or more actions of process 1200 may be incorporated into or combined with one or more actions of any other process or embodiments described herein.

At 1202, control circuitry 1010 accesses a video stream available in a plurality of resolutions. For example, control circuitry 1010 may transmit a request to a streaming media source for the video stream. Control circuitry 1010 may first use an authentication mechanism such as username-password authentication, OAuth tokens, API keys, or other forms of credentials through which the streaming media source may verify and/or authenticate the client device or a user account associated with the client device.

At 1204, control circuitry 1010 determines a highest available resolution ($R^+$) that can be supported by current network conditions. For example, control circuitry 1010 may determine a type of network connection currently being used by the client device (e.g., a 4G mobile network connection, a 5G mobile network connection, a Wi-Fi connection, an Ethernet connection, etc.) Control circuitry 1010 may also perform a test of the connection speed or available bandwidth. Based on the results of these test and determinations and the requirements for smooth transmission of each available resolution, control circuitry 1010 may identify $R^+$.

At 1206, control circuitry 1010 initializes a variable N, setting its initial value to one. This variable represents the resolution levels, where one is the lowest available resolution. $R_N$ therefore represents the current resolution. Control circuitry 1010 begins download of the video stream with the lowest resolution $R_1$ (i.e., N=1). At 1208, control circuitry 1010 determines whether $R_N$ is equal to $R^+$, meaning that the current resolution is the highest available resolution that can be supported by current network conditions. If so ("Yes" at 1210), then, at 1212, control circuitry 1010 decodes the downloaded frame for output.

If $R_N$ is not equal to $R^+$, meaning that there is at least one higher resolution available that can be supported by current network conditions ("No" at 1210), then, at 1214, control circuitry 1010 determines whether a residue frame corresponding to the current frame is available for resolution $R_{N+1}$ (i.e., the next highest resolution). For example, control circuitry 1010 may access the companion stream for resolution $R_{N+1}$ at the current frame to determine if any data is encoded for the current frame. In some embodiments, the companion stream may include flags or other metadata in a header or metadata file indicating the presence or absence of residue frames. As another example, control circuitry 1010 may access a manifest file for the stream. The manifest file may indicate, for each available resolution, whether a residue frame is present or absent for each frame. In a third example, control circuitry 1010 may determine or retrieve the interval at which residue frames were encoded by, e.g., control circuitry 910, into each companion stream. Control circuitry 1010 may then determine, based on the current frame number, whether a residue frame is encoded in the companion stream for resolution $R_{N+1}$.

If a residue frame corresponding to the current frame is available for resolution $R_{N+1}$ ("Yes" at 1214), then, at 1216, control circuitry 1010 downloads the residue frame corresponding to the current frame from the companion stream for resolution $R_{N+1}$. At 1218, control circuitry 1010 increments the value of N by one. This causes control circuitry 1010 to download subsequent frames from the next highest resolution.

At 1220, control circuitry 1010 determines whether $R_N$, which now refers to the next highest resolution as compared to 1208-1216, is equal to $R^+$, meaning that the new $R_N$ is the highest available resolution that can be supported by the current network conditions. If $R_N$ is not equal to $R^+$ ("No" at 1220), then, at 1222, control circuitry 1010 determines whether a residue frame corresponding to the current frame is available for resolution $R_{N+1}$ (i.e., the next highest resolution). If so, then processing returns to 1216 at which control circuitry 1010 downloads the residue from the companion stream for resolution $R_{N+1}$.

Residue frames may be encoded at different intervals for different resolutions. Accordingly, the presence of a residue frame in the companion stream for a first resolution is not a guarantee that a residue frame is also present in the companion stream for a second resolution. However, there may be times when residue frames are available for multiple resolutions corresponding to the same frame. If no residue frame corresponding to the current frame is available for $R_{N+1}$ ("No" at 1222), or if $R_N$ is equal to $R^+$ ("Yes" at 1220), then, at 1224, control circuitry 1010 decodes the current frame at resolution $R_N$ based on the downloaded frame and any downloaded residue frames. For example, control circuitry 1010 retrieves, for each pixel in the current frame, a color value or set of color values (e.g., RGB, YCbCr, or YUV values). Control circuitry 1010 also retrieves color values for each pixel of the residue frame downloaded from the next highest resolution companion stream. Control circuitry 1010 then adds the color values of each pixel in the residual frame to the color values of its respective corresponding pixel in the current frame to generate a frame with the same color values for each pixel as the original frame in normal stream for the resolution from which the residual frame was downloaded. If multiple residue frames are downloaded for the same frame, control circuitry 1010 adds the additional values from the additional residue frames to reconstruct a higher resolution frame.

The actions and descriptions of FIG. 12 may be used in any other embodiment of this disclosure. In addition, the actions and descriptions described in relation to FIG. 12 may be done in suitable alternative orders or in parallel to further the purposes of this disclosure.

The processes described above are intended to be illustrative and not limiting. One skilled in the art would appreciate that the steps of the processes described herein may be omitted, modified, combined, and/or rearranged, and any additional steps may be performed without departing from the scope of this disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for encoding video companion streams for fast resolution recovery, the method comprising:

receiving a source video for encoding in a video streaming protocol comprising, for each available resolution, a normal stream and a companion stream, wherein each normal stream contains intra-coded frames (I-frames) and predicted frames, wherein I-frames in a first normal stream are encoded at a first interval corresponding to a first amount of time;

encoding the first normal stream in a first resolution;

encoding a second normal stream at a second resolution higher than the first resolution;

generating a first upscaled frame by upscaling a first frame from the first resolution to the second resolution;

generating a residue representing a difference between the first upscaled frame and a corresponding frame of the second resolution that is used to generate the second normal stream by:

generating a reconstructed frame based on the predicted frame and at least one preceding frame of the second normal stream; and comparing the reconstructed frame with the first upscaled frame, wherein the corresponding frame of the second resolution is a predicted frame from the second normal stream; and encoding the residue in a second companion stream associated with the second normal stream such that, upon accessing the encoded video at a time when no I-frame is encoded in any normal stream, an output stream displays a high-resolution image based on an I-frame in a first companion stream associated with the first normal stream and the residue in the second companion stream associated with the second normal stream.

2. The method of claim 1, wherein the first frame is one of an I-frame from the first normal stream, a predicted frame from the first normal stream, or an I-frame from the first companion stream.

3. The method of claim 1, wherein the corresponding frame of the second resolution is an I-frame from the second normal stream, and wherein generating the residue representing the difference between the first upscaled frame and the corresponding frame of the second resolution comprises comparing the I-frame with the first upscaled frame.

4. The method of claim 1, wherein the corresponding frame of the second resolution is an uncompressed frame used to encode the second normal stream, and wherein the second normal stream includes a compressed frame corresponding to the uncompressed frame.

5. The method of claim 1, wherein encoding the residue in the second companion stream occurs at a second interval, wherein the second interval is shorter than the first interval.

6. The method of claim 1, wherein encoding the residue in the second companion stream does not occur for every frame.

7. The method of claim 1, wherein the first companion stream contains only I-frames.

8. The method of claim 1, further comprising:

encoding a third normal stream at a third resolution higher than the second resolution;

generating a second upscaled frame by upscaling the first frame of the second normal stream from the second resolution to the third resolution;

generating a second residue representing a difference between the second upscaled frame and the corresponding frame of the third resolution that is used to generate the third normal stream; and encoding the second residue in a third companion stream associated with the third normal stream.

9. The method of claim 8, wherein:

encoding the residue in the second companion stream occurs at a second interval shorter than the first interval; and encoding the second residue in the third companion stream occurs at a third interval shorter than the first interval and no shorter than the second interval, such that, upon accessing the encoded video at a time when no I-frame is encoded in any normal stream, the output stream displays a high-resolution image based on an I-frame in the first companion stream associated with the first normal stream, the residue in the second companion stream associated with the second normal stream, and the second residue in the third companion stream associated with the third normal stream.

10. A system for encoding video companion streams for fast resolution recovery, the system comprising:

input output circuitry configured to receive a source video for encoding in a video streaming protocol comprising, for each available resolution, a normal stream and a companion stream, wherein each normal stream contains intra-coded frames (I-frames) and predicted frames, wherein I-frames in a first normal stream are encoded at a first interval corresponding to a first amount of time; and control circuitry configured to:

encode the first normal stream in a first resolution;

encode a second normal stream at a second resolution higher than the first resolution;

generate a first upscaled frame by upscaling a first frame from the first resolution to the second resolution;

generate a residue representing a difference between the first upscaled frame and a corresponding frame of the second resolution that is used to generate the second normal stream by:

generating a reconstructed frame based on the predicted frame and at least one preceding frame of the second normal stream; and comparing the reconstructed frame with the first upscaled frame, wherein the corresponding frame of the second resolution is a predicted frame from the second normal stream; and encode the residue in a second companion stream associated with the second normal stream such that, upon accessing the encoded video at a time when no I-frame is encoded in any normal stream, an output stream displays a high-resolution image based on an I-frame in a first companion stream associated with the first normal stream and the residue in the second companion stream associated with the second normal stream.

11. The system of claim 10, wherein the first frame is one of an I-frame from the first normal stream, a predicted frame from the first normal stream, or an I-frame from the first companion stream.

12. The system of claim 10, wherein the corresponding frame of the second resolution is an I-frame from the second normal stream, and wherein the control circuitry configured to generate the residue representing the difference between the first upscaled frame and the corresponding frame of the second resolution is further configured to compare the I-frame with the first upscaled frame.

13. The system of claim 10, wherein the corresponding frame of the second resolution is an uncompressed frame used to encode the second normal stream, and wherein the second normal stream includes a compressed frame corresponding to the uncompressed frame.

14. The system of claim 10, wherein the control circuitry configured to encode the residue in the second companion stream is configured to do so at a second interval, wherein the second interval shorter than the first interval.

15. The system of claim 10, wherein the control circuitry configured to encode the residue in the second companion stream is configured not to do so for every frame.

16. The system of claim 10, wherein the first companion stream contains only I-frames.

17. The system of claim 10, wherein the control circuitry is further configured to:

encode a third normal stream at a third resolution higher than the second resolution;

generate a second upscaled frame by upscaling the second frame of the second normal stream from the second resolution to the third resolution;

generate a second residue representing a difference between the second upscaled frame and the corresponding frame of the third resolution that is used to generate the third normal stream; and encode the second residue in a third companion stream associated with the third normal stream.

18. The system of claim 17, wherein:

the control circuitry configured to encode the residue in the second companion stream is configured to do so at a second interval shorter than the first interval; and the control circuitry configured to encode the second residue in the third companion stream is configured to do so at a third interval shorter than the first interval and no shorter than the second interval, such that, upon accessing the encoded video at a time when no I-frame is encoded in any normal stream, the output stream displays a high-resolution image based on an I-frame in the first companion stream associated with the first normal stream, the residue in the second companion stream associated with the second normal stream, and the second residue in the third companion stream associated with the third normal stream.

* * * * *